US006973372B2

(12) United States Patent
Donat et al.

(10) Patent No.: US 6,973,372 B2
(45) Date of Patent: Dec. 6, 2005

(54) DRIVE UNIT AND METHOD FOR USING THE DRIVE UNIT TO CONTROL A MACHINE TOOL

(75) Inventors: Albrecht Donat, Dachsbach (DE); Rolf Florschütz, Grossenseebach (DE); Gerhard Heinemann, Erlangen (DE); Rolf-Jürgen Steinigeweg, Herzogenaurach (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/770,121

(22) Filed: Feb. 2, 2004

(65) Prior Publication Data

US 2004/0177705 A1 Sep. 16, 2004

Related U.S. Application Data

(63) Continuation of application No. PCT/DE02/02739, filed on Jul. 25, 2002.

(30) Foreign Application Priority Data

Aug. 2, 2001 (DE) ................................ 101 37 910

(51) Int. Cl.$^7$ ............................................ G06F 19/00
(52) U.S. Cl. ................... 700/245; 700/96; 700/97; 700/100; 700/165; 700/169; 700/247; 370/368; 370/369; 73/862.27
(58) Field of Search ................. 700/96–97, 100, 700/165, 169, 245, 247; 370/386, 389; 73/862.27

(56) References Cited

U.S. PATENT DOCUMENTS

| 4,459,655 A | | 7/1984 | Willemin |
| 4,698,766 A | * | 10/1987 | Entwistle et al. ............. 700/96 |
| 4,841,450 A | | 6/1989 | Fredriksson |
| 6,405,099 B1 | * | 6/2002 | Nagai et al. ................ 700/159 |
| 6,507,767 B2 | * | 1/2003 | Bourne et al. .............. 700/165 |

FOREIGN PATENT DOCUMENTS

DE 196 24 929 A 1/1998

OTHER PUBLICATIONS

Kirk R B: "Parallel Processing in Control Applications", I & CS—Industrial and Process Control Magazine, Chilton Company, Radnor, Pennsylvania US, vol. 63, No. 9, Sep. 1, 1990, pp. 41–45, XP000167890, ISSN:1074-2328.

* cited by examiner

Primary Examiner—Thomas G. Black
Assistant Examiner—McDieunel Marc
(74) Attorney, Agent, or Firm—Henry M. Feiereisen

(57) ABSTRACT

A drive unit for a machine, in particular a machine-tool, robot and the like, is described. The drive unit has several components, and each component has at least one associated component-specific function, and a uniform communication module that forms an interface with the other components. The interfaces of the various components can be connected by logical point-to-point connections or via a bus. Each component is designated with a particular type, and the communication between the components uses a type-specific communication protocol. A least one of the components is a hierarchically superior component.

11 Claims, 1 Drawing Sheet

DRIVE UNIT AND METHOD FOR USING THE DRIVE UNIT TO CONTROL A MACHINE TOOL

CROSS-REFERENCES TO RELATED APPLICATIONS

This application is a continuation of prior filed copending PCT International application no. PCT/DE02/02739, filed Jul. 25, 2002, which designated the United States and on which priority is claimed under 35 U.S.C. §120, the disclosure of which is hereby incorporated by reference.

This application claims the priority of German Patent Application, Serial No. 101 37 910.2, filed Aug. 2, 2001, pursuant to 35 U.S.C. 119(a)–(d), the disclosure of which is incorporated herein by reference.

BACKGROUND OF THE INVENTION

The present invention relates to a drive unit for controlling a machine, such as a production machine, machine tool, a robot and the like, as well as to a method for interfacing the various components of a drive unit.

The transition from an uncontrolled drive technology, wherein motors derive power directly from the power line, to a controlled drive technology, wherein motors are powered by converters, improves many processes that use this drive technology. Since many years, there is a continuing trend to replace uncontrolled drive units with controlled drive units, which goes hand in hand with the application of new concepts to machine design. As a result, both the production processes and the production quality are improved, as is the productivity of the controlled machine. The various machine designs and applications require different drive solutions, which at the present time are met by specialized products or by modular systems with diverse different interfaces between the components. The central components of a drive unit of a modern drive are connected in such a way that it is rarely possible to adapt them to different requirements. In addition, when new components become available, these components may not be easily useable in a drive unit without making significant changes in the different functions and more particularly, in the different interfaces between the components.

For example, when innovations in the user-defined process change the requirements of one of the core functions of the drive, i.e. the power, the quality of the control or the configuration, the drive may no longer be optimally configured, which can adversely affect its technical functionality and/or its cost.

Modern drives implement a large number of the functions, such as "set drive parameters" (for example, setting voltage and frequency or defining binary outputs), "convert drive energy" (for example, converting current to torque), "measure drive parameters" (for example, measuring current, position, acceleration and/or voltage), "control drive parameters" (for example, controlling rotation speed, current and/or pressure) and "monitor drive parameters" (for example, motor temperature, leakage currents to ground, positions). Another function enables the communication with the superimposed controller and the operating console. This function includes, for example, accepting rotation speed value setpoints, indicating rotation speed values and alarms, and setting parameters of the controller. The aforementioned functions are implemented in a conventional manner in different ways and over different interfaces in a drive unit, which is therefore afflicted by the disadvantages described above.

It would therefore be desirable and advantageous to provide a drive unit which obviates prior art shortcomings, which can be easily adapted to different requirements and which facilitates communication between the various components of the drive unit.

SUMMARY OF THE INVENTION

According to one aspect of the present invention, a drive unit for controlling machines, in particular production machines, machine tools, robots and the like, is described. The drive unit has a plurality of components, with each component including at least one component-specific function associated with the component, and a uniform communication module forming an interface. In this way, changes can be made to individual functions or elements of the components without requiring changes in other components.

According to an advantageous embodiment of the invention, at least one components is hierarchically superior to the other components, with all subordinate components communicating with the superior component via their respective interface. The hierarchically superior component assumes hereby the task of a so-called "central intelligence", i.e., it controls the subordinate components and coordinates the physical quantities supplied by the subordinate components for controlling the process, for example a machine tool or a robot. The interfaces can be connected with each other at logical points to form point-to-point connections therebetween, but alternatively or in addition also via a bus system.

According to another aspect of the invention, a method for controlling machines, in particular machine tools, robots and the like, with a drive unit that includes a plurality of components is disclosed. The method includes the steps of assigning a type to each of the components, assigning at least one component-specific function to each component type, and associating a uniform communication module with each of the components, with the communication module forming an interface. The method further includes the steps of associating a type-specific communication protocol with each component type, designating at least one component of the plurality of components as being a hierarchically superior component, with the remaining components of the plurality of components being designated as subordinate components, and enabling communication between the superior component and the subordinate components via the type-specific communication protocol.

According to an advantageous embodiment of the method, the type-specific protocol of each subordinate component is indicated to the superior component when the drive unit is switched on, whereafter the superior component communicates with the respective subordinate component type only via this type-specific protocol.

According to another advantageous embodiment of the invention, the component types are described by their respective physical parameters, such as for example current, voltage, power and temperature. This information is sent to the supervisory component via another protocol that is independent of the component type. The description by way of physical parameters eliminates communication problems in that, for example, the supervisory component does not have to be changed when the physical parameters and/or the description of the physical parameters change.

BRIEF DESCRIPTION OF THE DRAWING

Other features and advantages of the present invention will be more readily apparent upon reading the following description of currently preferred exemplified embodiments of the invention with reference to the accompanying drawing, in which the sole

DETAILED DESCRIPTION OF PREFERRED EMBODIMENTS

Figure 1:
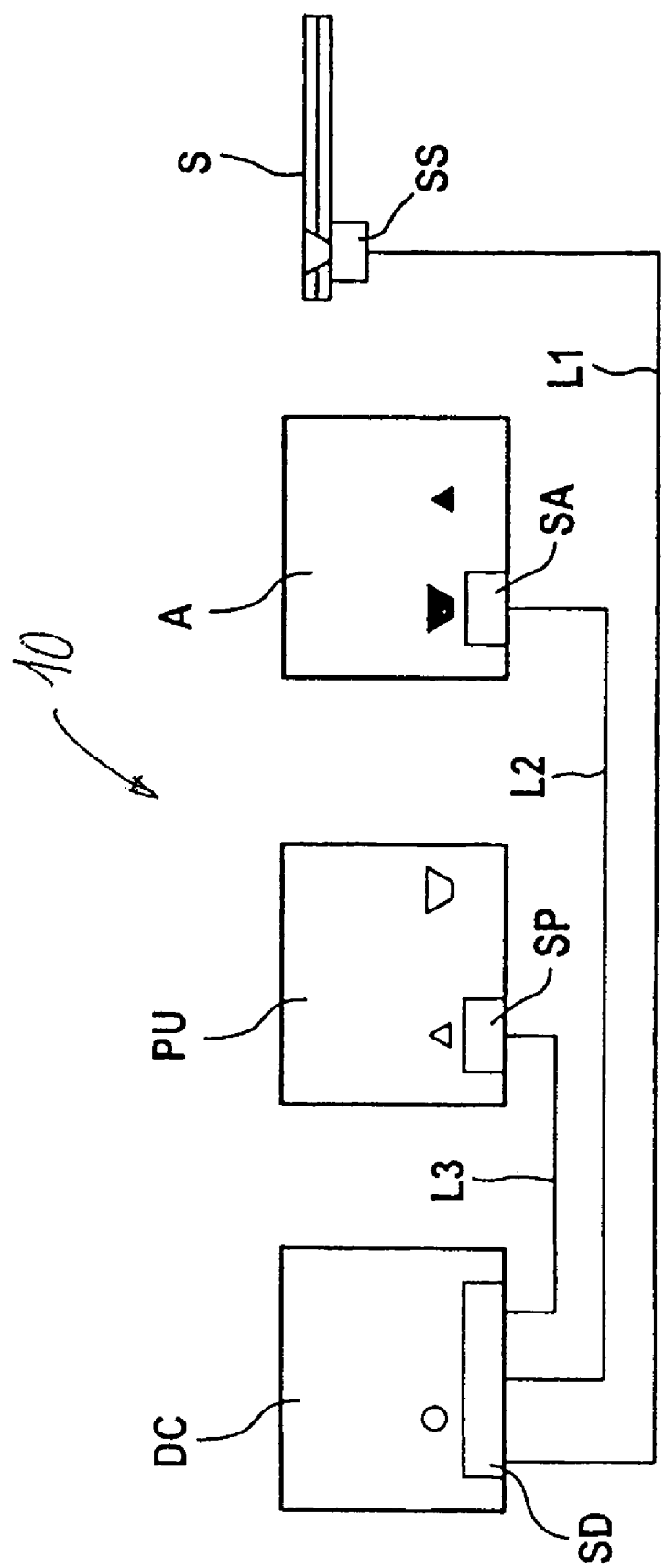
FIG. 1 is a schematic block diagram of an exemplary drive unit according to the present invention.

The depicted embodiment is to be understood as illustrative of the invention and not as limiting in any way. It should also be understood that the drawings are not necessarily to scale and that the embodiment are sometimes illustrated by graphic symbols, phantom lines, diagrammatic representations and fragmentary views. In certain instances, details which are not necessary for an understanding of the present invention or which render other details difficult to perceive may have been omitted.

Turning now to the only FIG. 1, there is shown a drive unit 10 which includes four separate exemplary components, namely a central drive control unit DC, a power unit PU, and an actor component A, wherein the actor A can be, for example, an electric motor or a pneumatic drive. The fourth component can be a sensor S. A dedicated interface SD, SP, SA, SS is associated with each of the components DC, PU, A, S of the drive unit 10. The interfaces SD, SP, SA, SS are connected with each other via interface lines L1, L2 and L3. The interface lines L1, L2 and L3 can represent serial lines, for example, point-to-point connection as shown in FIG. 1, or one or more bus systems. It will be understood that the interface lines L1, L2 and L3 can be implemented either as electrical connections, as wireless connections or as optical waveguides.

The geometric figures, such as circle, triangle or trapezoid, are meant to symbolize different functions performed by the respective drive components. However, this list of figures is not exhaustive, and persons skilled in the art will readily appreciate that other functions can also be implemented. The filled circle of the central control unit DC symbolizes, for example, the function "control rotation speed", whereas the open circle symbolizes the function "control current". The triangle in the power unit PU symbolizes, for example, the function "set voltage", whereas the function "measure current" is indicated by the trapezoid. The filled trapezoid in the actor component A can symbolize, for example, the function "measure rotation speed", and the filled triangle can symbolize the function "convert energy", i.e., the conversion of current into torque. The trapezoid in the sensor component S can symbolize, for example, the function "measure distance".

As mentioned above, the functions indicated for the different components DC, PU, A, S do not represent a complete listing of all possible functions. Additional functions of the actuator are, for example, "monitor motor" and "protect motor", as well as communication with the central control unit DC via the associated interface SA. The functions of the sensor(s) are directed to measuring physical quantities, for example distances, angles, temperature, pressure, etc., but are also directed to monitoring the sensor S itself as well as to the communication between the sensor A and the central control unit DC via the interface SS.

Additional functions of the power unit PU can be directed to, for example, "self-monitoring and self-protection", as well as to the communication between the power unit PU and the central control unit DC via the interface SP.

The functions of the central control unit DC, which typically has a central processor unit (CPU), are directed to controlling the torque and the rotation speed, system diagnosis and to the communication with the supervisory automation plane (not shown in FIG. 1).

All components are connected with the central control unit DC via identical interfaces SS, SA, SP. In other words, the information supplied by the subordinate components PU, A, S via the interfaces SS, SA, SP is not coded differently, which eliminates the need for the supervisory central control unit DC to be informed about different coding schemes and to convert different coding schemes. Instead, the supervisory central control unit DC can expect that the subordinate components, when supplying for example a current value, actually supply this value as a physical current value. A current of 0.5 A is displayed, for example, as a floating point value "0.5 A" and not, for example, as a binary or hexadecimal value.

The performance of the interfaces allows the components to be distributed over greater distances. In addition to logical point-to-point connections, the interfaces can also be connected in the form of a bus structure, whereby different component types (e.g., actuators, sensors) can be operated on a single bus segment. The communication via a corresponding interface SS, SA, SP is defined by the function of the component. Each component has its own data processing module (own intelligence) which enables the functions implemented on that component to be communicated to the supervisory central control unit DC.

In general, the drive functions are associated with the drive components in the described drive unit so that each component can be upgraded individually and independently. For example, new elements can be placed into the individual components or the functions of individual components can be adapted to changed requirements of the mechanical engineer, without affecting the other components. This is accomplished by leaving the interfaces unchanged.

The cooperation between the various components DC, PU, A, S is implemented by having the data processing module of each component transmit to the central control unit DC the component type when the drive is switched on. Thereafter, the central control unit DC communicates with this component only via the protocol defined for that particular component. The values of the parameters transmitted to the interface SD of the central control unit DC via the interfaces SS, SA, SP depend on the particular embodiment, i.e., on the component type. However, the values are transmitted to the central control unit DC via a protocol that is independent of the component design or configuration. Due to the unique definition of the physical quantities of a component, the process does not depend on software states and component configurations.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A drive unit for controlling a machine, with a plurality of components, each component comprising at least one component type and at least one component-specific function associated with the component, and a type-specific communication protocol associated with each component type, and a uniform communication module forming an interface, wherein at least one component of the plurality of components is hierarchically superior to the other components of the plurality of components, with the other components representing subordinate components, wherein the subordinate components communicate with the supervisory component via the respective type-specific communication protocol.

2. The drive unit according to claim 1, wherein the interfaces are connected by logical point-to-point connections.

3. The drive unit according to claim 1, wherein the interfaces are connected by a bus system.

4. The method of claim 1, wherein the type-specific communication protocol of each subordinate component is indicated to the superior component when the drive unit is switched on.

5. The method of claim 1, wherein the machine is selected from the group consisting of machine tools and robots.

6. A method for controlling a machine, with a drive unit that includes a plurality of components, comprising the steps of:

assigning a type to each of the components, assigning at least one component-specific function to each component type, associating a uniform communication module with each of the components, said communication module forming an interface, associating a type-specific communication protocol with each component type, designating at least one component of the plurality of components as being a hierarchically superior component, with the remaining components of the plurality of components being designated as subordinate components, and enabling communication between the superior component and the subordinate components via the type-specific communication protocol.

7. The method of claim 6, wherein the type-specific communication protocol of each subordinate component is indicated to the superior component when the drive unit is switched on.

8. The method according to claim 6, wherein each component type is described by physical parameters associated with the component type, and wherein the physical parameters are indicated to the superior component by using another protocol that is independent of the component type.

9. The method of claim 6, wherein the machine is selected from the group consisting of machine tools and robots.

10. The method of claim 6, wherein the Interfaces are connected by logical point-to-point connections.

11. The method of claim 6, wherein the interfaces are connected by a bus system.

* * * * *